United States Patent
James

(10) Patent No.: US 7,085,480 B1
(45) Date of Patent: Aug. 1, 2006

(54) AV/C COMMANDS FOR ACCESSING A HARD DISK DEVICE

(75) Inventor: David V. James, Palo Alto, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/267,150

(22) Filed: Mar. 11, 1999

Related U.S. Application Data

(63) Continuation of application No. 60/078,018, filed on Mar. 14, 1998.

(51) Int. Cl.
*H04N 5/781* (2006.01)

(52) U.S. Cl. .................. 386/126; 386/95; 360/72.2

(58) Field of Classification Search .............. 386/45, 386/46, 70, 95, 97, 111–112, 125–126; 360/13, 360/72.1, 72.2; 707/1, 3, 4, 10, 205
See application file for complete search history.

(56) References Cited

U.S. PATENT DOCUMENTS

| | | | |
|---|---|---|---|
| 5,267,351 A | | 11/1993 | Reber et al. |
| 5,333,315 A | | 7/1994 | Saether et al. |
| 5,463,772 A | | 10/1995 | Thompson et al. |
| 5,488,409 A | * | 1/1996 | Yuen et al. ............... 360/72.2 |
| 5,724,575 A | * | 3/1998 | Hoover et al. ............. 707/10 |
| 5,875,446 A | * | 2/1999 | Brown et al. ............... 707/3 |
| 6,067,282 A | * | 5/2000 | Moriyama et al. .......... 386/97 |
| 6,167,189 A | * | 12/2000 | Taira et al. ............... 386/95 |
| 6,289,166 B1 | * | 9/2001 | Uno et al. ................. 386/46 |
| 6,370,325 B1 | * | 4/2002 | Nakatani et al. .......... 386/126 |
| 6,385,389 B1 | * | 5/2002 | Maruyama et al. ........ 386/125 |
| 6,415,098 B1 | * | 7/2002 | Taira ....................... 386/70 |

FOREIGN PATENT DOCUMENTS

EP  0661652 A1  7/1995

OTHER PUBLICATIONS

AV/C Digital Interface Command Set General Specification, Version 3.0 1394 Trade Association, Apr. 15, 1998, pp. 20-34, 49-53.
"AV/C Disc Subunit General Specification", Version 1.0 1394 Trade Association, Jan. 26, 1999, pp. 8-53.

* cited by examiner

*Primary Examiner*—James J. Groody
*Assistant Examiner*—Christopher Onuaku

(57) ABSTRACT

A method and system thereof for organizing and accessing stored data in a mass storage unit such as a hard disk device. An object is associated with the stored data, and a unique object identifier is derived for and assigned to the object by the hard disk device. The object is addressed by its object identifier. The object is maintained in a hierarchical organization with other objects. The hierarchical organization includes an object list that contains the object identifier and also includes object identifiers for the other objects. Commands are defined for accessing and operating on the stored data using the object identifier for the object associated with the data. Thus, objects are named and organized on a hard disk device in an audio/visual network in a uniform manner, and the objects are represented to devices in the AV network so that they can be readily accessed and retrieved by those devices. In one embodiment, the unique object identifier includes a first portion representing a unique vendor number for the particular hard disk device and a second portion representing a unique assignment such as the date and time that the object was created.

31 Claims, 13 Drawing Sheets

610

| cts | ctype | subunit_type | subId | opcode | operand[0] |
|-----|-------|--------------|-------|--------|------------|
| quadlet 1 ||||||
| quadlet 2 ||||||
| (...) ||||||

| cts | ctype | subunit_type | subId | opcode | plugId |
|---|---|---|---|---|---|
| modes ||||||
| objectIdHi ||||||
| objectIdLo ||||||
| startTimeHi ||||||
| startTimeLo ||||||
| maxFileLengthHi ||||||
| maxFileLengthLo ||||||
| maxElapsedTimeHi ||||||
| maxElapsedTimeLo ||||||
| tocPlacement ||||||

| cts | ctype | subunit_type | subId | opcode | plugId |
|---|---|---|---|---|---|
| modes ||||||
| objectIdHi ||||||
| objectIdLo ||||||
| startOffsetHi ||||||
| startOffsetLo ||||||
| endOffsetHi ||||||
| endOffsetLo ||||||

| cts | ctype | subunit_type | subId | opcode | plugId |
|-----|-------|--------------|-------|--------|--------|
| modes ||||||
| objectIdHi ||||||
| objectIdLo ||||||
| startOffsetHi ||||||
| startOffsetLo ||||||
| endOffsetHi ||||||
| endOffsetLo ||||||
| entrySelect ||||||
| elementSelect ||||||

| cts | ctype | subunit_type | subId | opcode | plugId |
|---|---|---|---|---|---|
| modes | | | | | |
| objectIdHi | | | | | |
| objectIdLo | | | | | |
| byteOffsetHi | | | | | |
| byteOffsetLo | | | | | |
| returnedDataValues (256 bytes) | | | | | |

| cts | ctype | subunit_type | subId | opcode | plugId |
|---|---|---|---|---|---|
| modes ||||||
| objectIdHi ||||||
| objectIdLo ||||||
| byteOffsetHi ||||||
| byteOffsetLo ||||||
| returnedDataValues (256 bytes) ||||||

FIGURE 12

AV/C COMMANDS FOR ACCESSING A HARD DISK DEVICE

RELATED U.S. APPLICATION

This application claims priority to the provisional patent application Ser. No. 60/078,018, entitled "AV/C Commands for Accessing a Hard Disk Device (HDD) Subunit," Filing Date Mar. 14, 1998, and assigned to the assignee of the present application.

BACKGROUND OF THE INVENTION

1. Field of the Invention

The present invention relates to the field of consumer electronic devices coupled in an audio/visual network. More specifically, the present invention pertains to a system and method for organizing and accessing data stored in a hard disk device in the audio/visual network.

2. Background Art

Audio/visual (AV) network architectures provide a powerful platform on which device functionality and interoperability can be built, and are capable of taking advantage of the increased sophistication that is being incorporated into consumer electronic devices. The typical AV home or office network consists of a variety of consumer electronic devices that present and record AV media in different ways. For instance, the typical AV equipment found in a home includes a number of components such as a radio receiver or tuner, a compact disk (CD) player and/or a digital video disc player (DVD), a number of speakers, a television, a video cassette recorder (VCR), a tape deck, and the like, and also may include a personal computer (PC).

A communication standard, the IEEE 1394 standard, has been defined for networking consumer electronic devices using a standard communication protocol layer (e.g., the audio visual control [AV/C] protocol). The IEEE 1394 standard is an international standard for implementing an inexpensive high-speed serial bus architecture for interconnecting digital devices, thereby providing universal input/output connection. The IEEE 1394 standard defines a digital interface for applications, thereby eliminating the need for an application to convert digital data to an analog form before it is transmitted across the bus. Correspondingly, a receiving application will receive digital data, not analog data, from the bus and will therefore not be required to convert analog data to digital form. The IEEE 1394 standard is ideal for consumer electronics communication in part because devices can be added to or removed from the serial bus while the bus is active. The IEEE 1394 standard supports both asynchronous and isochronous format data transfers.

Prior Art FIG. 1 illustrates an exemplary hard disk device (HDD) 10 commonly used for storing asynchronous and isochronous data. Data are stored on platter 6 that rotates on spindle 4. HDD 10 has a number of movable read/write heads 8 that are moved closer to or further from the center of platter 6 using arm 2 in order to read from or write to different parts of platter 6. A hard disk device typically has several platters stacked vertically and attached to spindle 4. In such a configuration, arm 2 will have one read/write head for each surface of the platters.

The radial position of the heads relative to spindle 4 is called the cylinder. Each head is wide enough to read or write from one track. Tracks are divided into sectors containing a certain number of bytes of data, typically 512 bytes. To access data on HDD 10, it is necessary to specify a cylinder and head, which together identify a specific track, the sector number where the data starts, and the number of bytes to be accessed. Data transactions generally start at the beginning of a sector.

In prior art computer systems, an object stored on HDD 10 is normally accessed by a logical block address. HDD 10, or the program controlling HDD 10, performs a limited amount of mapping to map the logical address for the object to the physical location of the associated data on the disk. The user is presented with what appears to be a contiguous range of logical blocks, providing the illusion that objects are stored contiguously on HDD 10 even though that is often not the case. This prior art method for storing data is problematic because it does not allow HDD 10 to be easily shared by multiple objects that do not work well together. For example, applications such as the Windows and Unix systems do not work well together on HDD 10 unless they are separated into partitions. However, the size of the partitions is difficult to change, and so the prior art is also problematic because it is not flexible and objects cannot be readily changed in size.

Another type of "track" is with regard to the sequence of the media stored in consumer minidisks (MDs). As new content is loaded into the MD it is stored at a track number. However, track numbers can change often over the course of time. For example, the deletion or insertion of file stored at a track affects all of the following tracks, shifting the number of a following track by one position. Hence, the track number cannot be used to address objects shared by multiple devices in the AV network because the track number may change between the time the object was recorded on the MD and the time it is later accessed and retrieved by another device on the network. A device on the network may store a certain track number that initially specifies a particular object, but at some later time when the device specifies that track number it very well could receive a different object than what is required. For example, an object initially identified on an MD as "track[3]" will be subsequently identified as "track[2]" if a file stored at a preceding track is deleted, and "track[4]" will then be known as "track[3]." A device on the AV network that then requests "track[3]" from the MD will receive the track previously identified as track[4] instead of the desired track.

Thus, there is currently a lack of mechanisms and methods for uniformly naming and organizing information (an "object") stored on a HDD in an AV network, in particular a network compliant with the AV/C protocol, and for representing those objects to a user or to other devices in the AV network. Within an AV network in which many different types of devices may be coupled together, it is desirable to represent the objects in a uniform manner so that they can be readily accessed by a user or by other devices in the network.

SUMMARY OF THE INVENTION

Accordingly, what is needed is a method and system for naming and organizing objects stored on a hard disk device in an AV network in a uniform manner, and that represents those objects to other devices in the AV network so that the objects can be readily accessed and so that the correct object is retrieved. What is also needed is a method and system that is flexible and allows the size of the object to be easily changed.

The present invention includes a method and system thereof that names and organizes objects stored on a hard disk device in an audio/visual (AV) network in a uniform manner. The present invention represents those objects to other devices in the AV network so that the objects are readily accessed and so that the correct object is retrieved. The present invention also includes a method and system thereof that are flexible and allow the size of the object to be easily changed. These and other advantages of the present invention not specifically mentioned above will become clear within discussions of the present invention presented herein.

The present invention-pertains to a method and system thereof for organizing and accessing stored data in a mass storage unit, such as a hard disk device, in an AV network. An object is associated with the stored data, and a unique object identifier is derived for and assigned to the object by the mass storage unit. The object is addressed by its object identifier. The object is maintained in a hierarchical organization with other objects, wherein the hierarchical organization includes an object list that contains the object identifier and also includes object identifiers for the other objects. The hard disk device manages the mapping of the object identifiers to the actual physical storage location of the data associated with an object.

In the present embodiment, the devices in the AV network are compliant with AV/C (audio visual control) protocol, and the AV network is compliant with the IEEE 1394 communication standard.

In the present embodiment, the object identifiers are arranged in a hierarchical structure in which objects directly or indirectly reference other objects. For example, in the hierarchical structure a list object may be used to group objects that have a similar purpose. Objects that point to other objects use the object identifiers of the other objects as a reference rather than the address of the actual physical location of the data. An object can be directly accessed based on its object identifier. Alternatively, an object can be found by navigating through the object hierarchy using the object identifier.

In the present embodiment, an object may contain descriptive information that describes itself. An object can also be located using this descriptive information.

In the present embodiment, the object identifier is not reused for another object. In one embodiment, the object identifier is based on an identification number assigned by the hard disk device so that the object identifier is unique for that hard disk device. In another embodiment, the object identifier includes a value uniquely assigned to the hard disk device by the vendor and so the object identifier is unique across all hard disk devices.

In one embodiment, a general data packet format is defined for commands that are used to access and operate on the stored data using the object identifier for the object associated with the data. The commands used include: RECORD_TRACK for recording into a track object, PLAY_TRACK for playing a track object, PLAY_TRACKS for playing from a subtrack array, READ_TRACK for reading from a track object, and WRITE_TRACK for writing to a track object.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 6 illustrates the general data packet format for AV/C commands used in accordance with one embodiment of the present invention.

FIG. 7 illustrates one embodiment of the RECORD_TRACK command structure used in accordance with the present invention.

FIG. 8 illustrates one embodiment of the PLAY_TRACK command structure used in accordance with the present invention.

FIG. 9 illustrates one embodiment of the PLAY_TRACKS command structure used in accordance with the present invention.

FIG. 11 illustrates one embodiment of the READ_TRACK command structure used in accordance with the present invention.

FIG. 12 illustrates one embodiment of the WRITE_TRACK command structure used in accordance with the present invention.

DETAILED DESCRIPTION OF THE INVENTION

Figure 1:
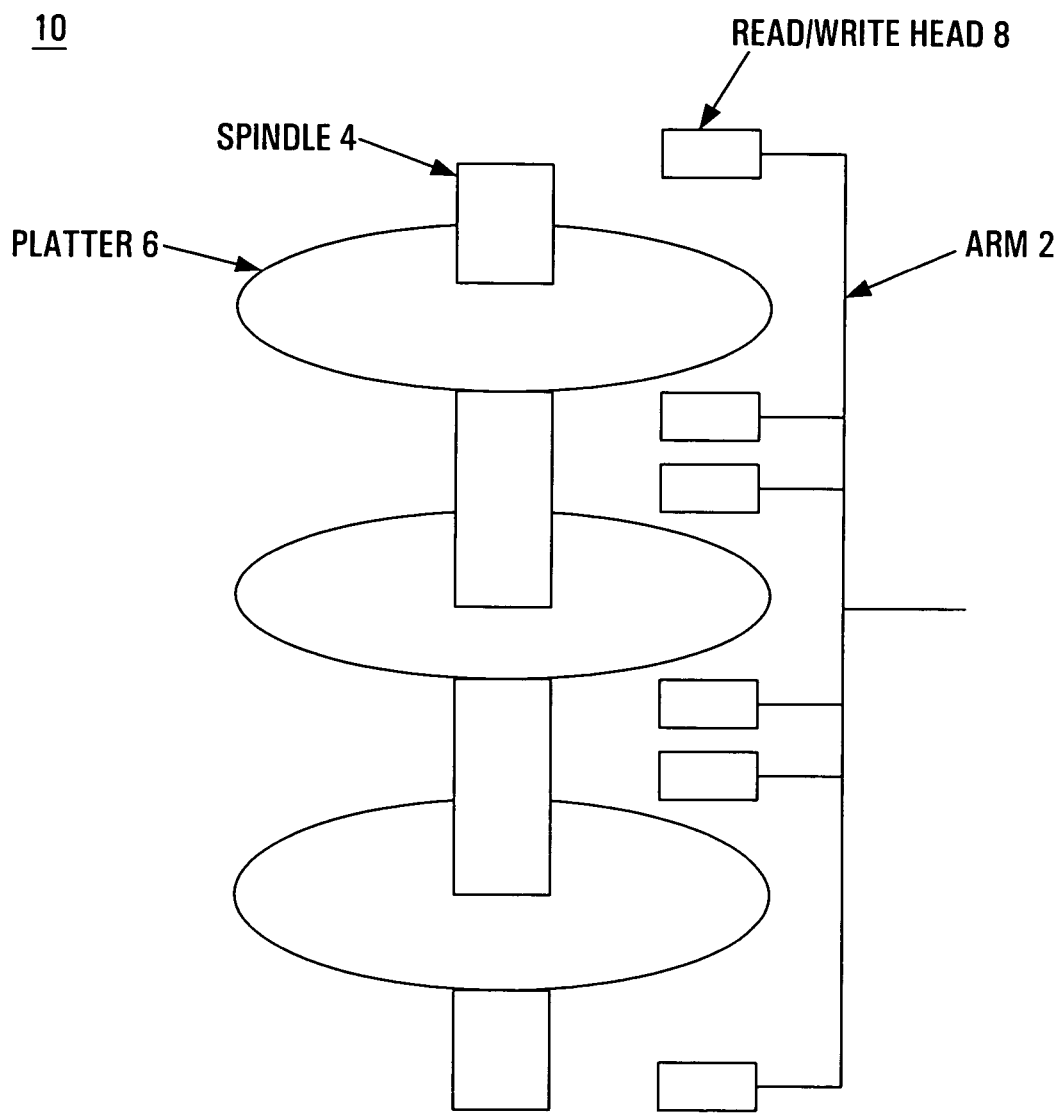
FIG. 1 illustrates one embodiment of a mass storage unit of the prior art.

In the following detailed description of the present invention, AV/C commands for accessing a hard disk device, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within an intelligent electronic media device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a consumer electronic media device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "associating" or "deriving" or "assigning" or "calculating" or "maintaining" or "accessing" or the like, refer to the action and processes of an electronic device such as a microcontroller or similar electronic computing device (e.g., dedicated or embedded computer system) that manipulates and transforms data. The data are represented as physical (electronic) quantities within the electronic device's registers and memories and is transformed into other data similarly represented as physical quantities within the electronic device memories or registers or other such information storage, transmission, or display screens.

Current and proposed technologies allow consumer electronic devices to be connected in a home or office network and to transfer audio information, video information and other data to each other over a network bus. For the discussion herein, terms such as "electronic device" (e.g., controller device 12 of FIG. 3A) and "network" are not limited to any form or type of device nor to any type of distribution network or data format. For the discussion herein, the present invention is discussed in the context of a home network comprising electronic devices interconnected by hardware using a serial bus and communicating via a standard protocol.

The present invention includes a method and system thereof that name and organize objects stored on a hard disk device (HDD) in an audio/visual (AV) network in a uniform manner, and that represent those objects to other devices in the AV network so that the objects are readily accessed and so that the correct object is retrieved. In the present embodiment, an object is associated with data stored on the HDD, and a unique object identifier is derived for and assigned to the object by the HDD. The object is subsequently located using the object identifier. The object is maintained in a hierarchical organization with other objects, wherein the hierarchical organization includes an object list that contains the object identifier and also includes object identifiers for the other objects. Commands are defined for accessing and operating on the stored data using the object identifier for the object associated with the data.

Notation and Nomenclature

For the discussion herein, the following terms and their general definitions are used. It is appreciated that the terms are not limited to these general definitions.

An "object" refers to an entity that is saved in a mass storage unit (e.g., a hard disk device, HDD; see FIG. 3B) and is accessed through its object identifier. An object can contain user-visible data, pointers to other objects, and other device-dependent resources. A "nonleaf object" is an object that has a standard reference to other objects at a lower level in a hierarchy of objects. A "leaf object" is an object that does not have a reference to other objects.

"Descriptive data" (or descriptor data or information) is user-accessible data associated with an object that may be used to describe the content or the uses of that object.

An "object identifier" is a unique identifier value assigned to each object by a HDD unit in accordance with the present invention. In the present embodiment, an object identifier is not reused for another object. In one embodiment, the object identifier is a 64-bit value, for example, although it is appreciated that identifiers of other sizes can be used in accordance with the present invention. By using a 64-bit value, it is possible to provide a unique identifier for each object that remains valid for the lifetime of the mass storage unit. For example, it is possible to derive an object identifier that includes the time and date at which the object was initially stored. In another embodiment, the object identifier is a 128-bit value. With a 128-bit value, in addition to the information included in the 64-bit object identifier, the object identifier can include a unique identification number assigned to the vendor of the HDD unit as well as an identification number uniquely assigned to the HDD unit by the vendor. Accordingly, no other object will have the same object identifier.

A "track" is a logically contiguous storage area on a HDD unit where data are located. It is appreciated that a HDD unit may actually store a track as a scattered set of sectors. A track typically contains time-sequenced (e.g., isochronous) stream data, either audio or video. A "track object" is a specific instance of a leaf object associated with a track. The descriptor portion of a track object describes the track length and its contents (e.g., copyrighted data, etc.) but does not export its knowledge of the physical location of the data (that is, for example, the physical location is kept hidden from the application and from the user).

Distributed Audio Visual Network

Figure 2:
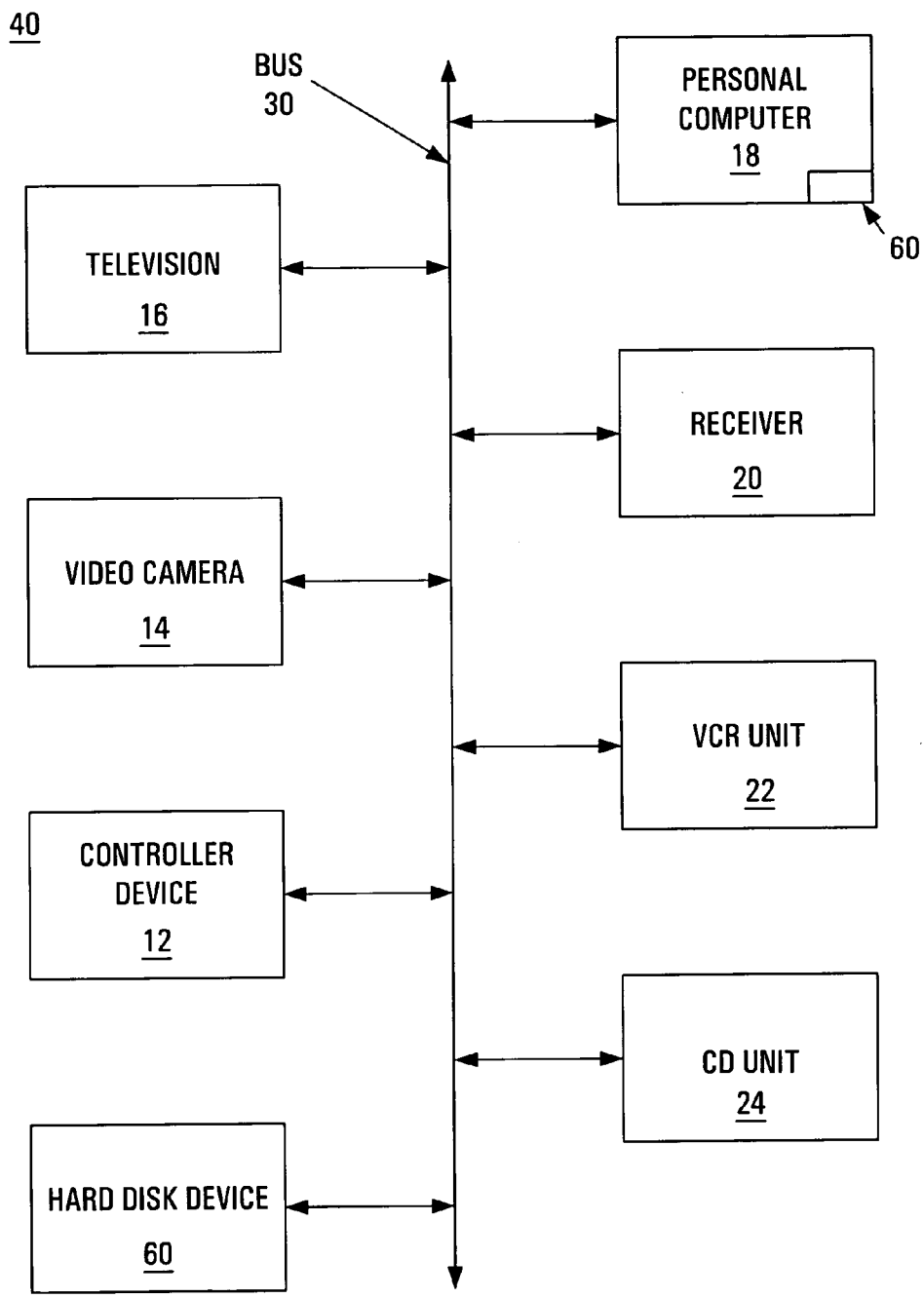
FIG. 2 illustrates an exemplary audio/visual network upon which embodiments of the present invention may be practiced.

FIG. 2 illustrates an exemplary network 40 that can support embodiments of the present invention. Network 40 comprises consumer electronic devices including personal computer systems, and can be extended to incorporate other electronic devices in different combinations than those illustrated.

Network 40 includes an integrated receiver/decoder device such as intelligent controller device 12, video camera 14, television 16, personal computer 18, receiver 20, video cassette recorder (VCR) unit 22, and compact disk (CD) unit 24 that are coupled together in network 40 by a network interface (e.g., bus 30). Controller device 12 is an intelligent controller device such as a set-top-box or a personal computer that controls a target device (e.g., the other consumer electronic devices of network 40). Network 40 also includes a hard disk device (HDD) 60. HDD 60 is a hard disk device that can be implemented either as a separate device on network 40 or as a subunit of another device on network 40 such as personal computer 18.

In the present embodiment, bus 30 is a bus compliant with IEEE 1394. Accordingly, the consumer electronic devices of network 40 communicate over bus 30 using a protocol compliant with IEEE 1394 such as AV/C (audio visual control) protocol. Embodiments of the present invention are operable with various network architectures and other protocols such as a network of consumer electronic devices compliant with the home audio/visual interoperability (HAVi) architecture.

The consumer electronic devices are each considered a logical entity represented as a node on network 40, with a unique address, a set of control registers, and volatile and non-volatile memory units. The consumer electronic devices in network 40 are capable of interacting with each other on a peer-to-peer basis, and data, commands and the like can be sent between the devices within network 40.

Figure 3A:
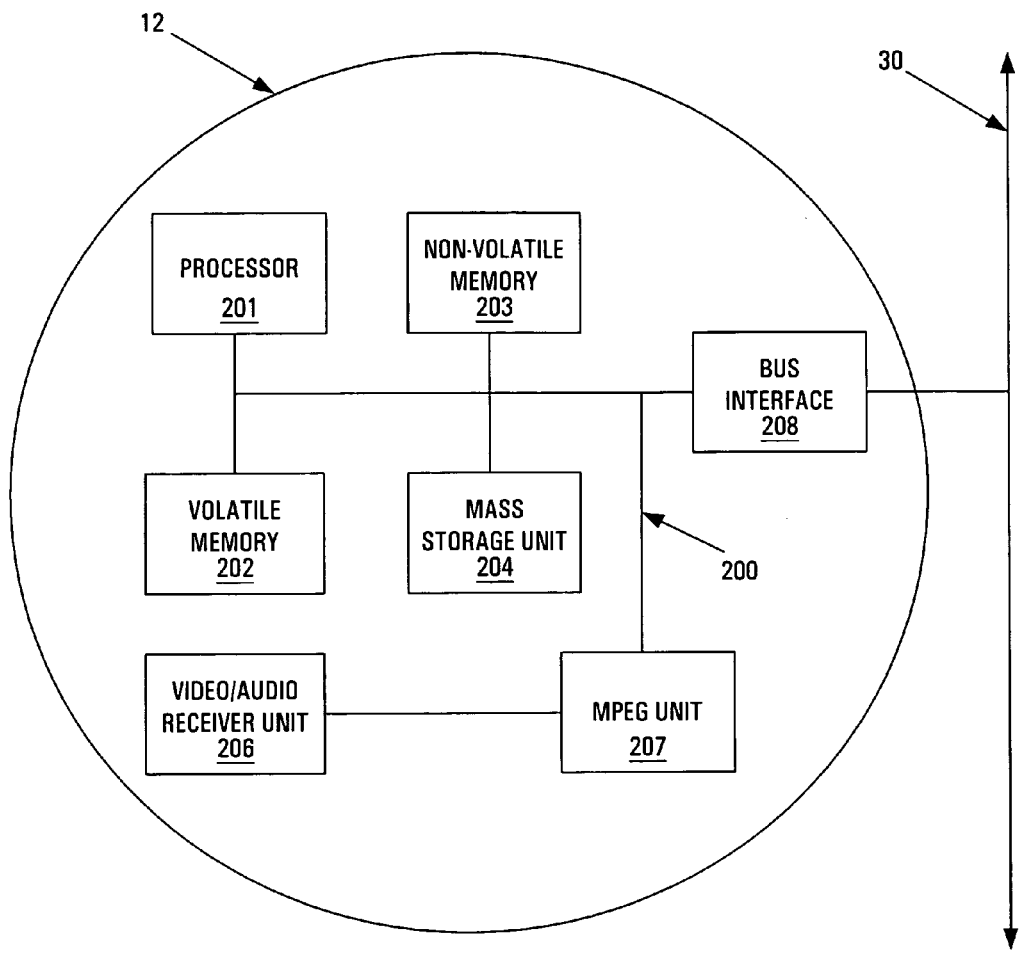
FIG. 3A is a block diagram of one embodiment of a controller device used in accordance with the present invention.

FIG. 3A is a block diagram of one embodiment of controller device 12. Although a variety of different systems can be used in accordance with the present invention, an exemplary system is represented by controller device 12.

With reference to FIG. 3A, controller device 12 includes processor 201 coupled with an internal address/data bus 200 for processing information and instructions. Volatile memory 202 (e.g., random access memory), for storing information and instructions for processor 201, is also coupled to bus 200. Non-volatile memory 203 (e.g., read only memory), for storing static information and instructions for processor 201, is coupled to bus 200. Controller device 12 optionally includes mass storage unit 204 (e.g., a data storage device such as a magnetic or optical disk and disk drive) coupled to bus 200 for storing information and instructions. Controller device 12 also includes video/audio receiver unit 206 and Moving Pictures Expert Group (MPEG) unit 207 coupled to bus 200. Bus interface 208 is used for interfacing with network bus 30.

Figure 3B:
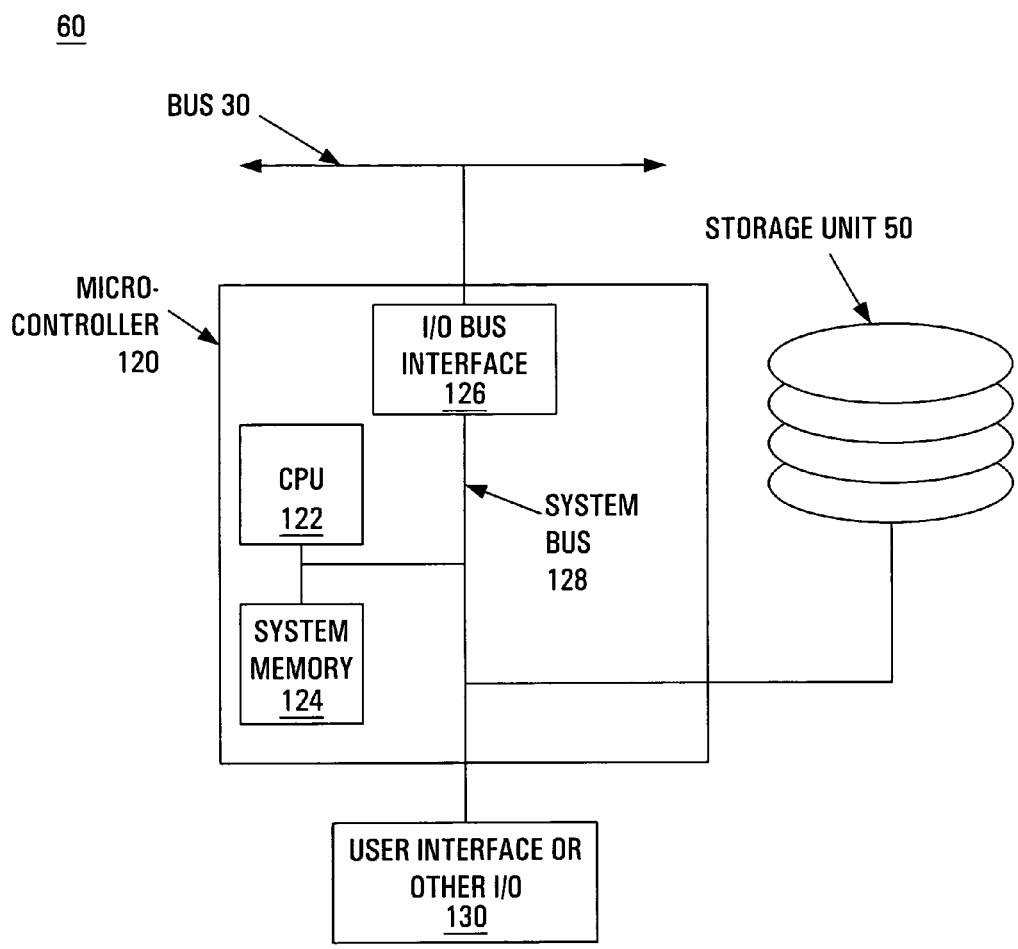
FIG. 3B is a block diagram of one embodiment of a mass storage unit upon which embodiments of the present invention may be practiced.

FIG. 3B is a block diagram of an exemplary mass storage unit upon which embodiments of the present invention may be implemented. In the discussions below, the present invention is discussed in the context of a hard disk device (HDD) unit, although it is appreciated that the present invention may be practiced on various types of mass storage units. HDD 60 can be implemented as a separate unit in a network (e.g., network 40 of FIG. 2) or it can be implemented as a subunit in a device on network 40.

HDD unit 60 is coupled to network bus 30 via the input/output (I/O) bus interface 126. HDD unit 60 includes microcontroller 120 ("embedded system") and storage unit 50 coupled by system bus 128. Storage unit 50 typically comprises a plurality of platters for storing data magnetically, although other storage media may be used in accordance with the present invention. Microcontroller 120 includes central processing unit (CPU) 122 coupled to system memory 124 via system bus 128. User interface 130 is also coupled to system bus 128. User interface 130 is device specific but preferably includes a keyboard and display, although other I/O devices may be used for communicating with a user.

HDD unit 60 is used to store objects as data in storage unit 50. Microcontroller 120 is an embedded system that is used to assign and manage object identifiers to the objects stored in HDD unit 60 so that the objects can be accessed and retrieved. Microcontroller 120 manages the mapping of the object identifiers to the actual physical storage location of the data associated with an object. Thus, microcontroller 120 assumes the burden of this task instead of the application, and provides HDD unit 60 with the flexibility to efficiently manage object-related storage.

Microcontroller 120 also is responsible for discarding objects that have lost their place in the object hierarchy; for example, when an object higher in the object hierarchy is deleted, an object solely referenced by that object is deleted by microcontroller 120. Microcontroller 120 is also used to invoke commands, such as play and record commands and other commands implemented in accordance with the present invention.

A large application, such as the operating system for a personal computer (e.g., Windows or Unix), is stored as a large and persistent track object on HDD unit 60. Thus, in accordance with the present invention, different operating systems are allocated to different tracks; for example, Windows could be allocated to track[4] and Unix to track[7]. The size of the object is readily specified and changed. Thus, the present invention provides a flexible method and system that allow, for example, two distinct operating systems to reside on the same disk.

EXEMPLARY EMBODIMENT OF OBJECT HIERARCHY

Figure 4:
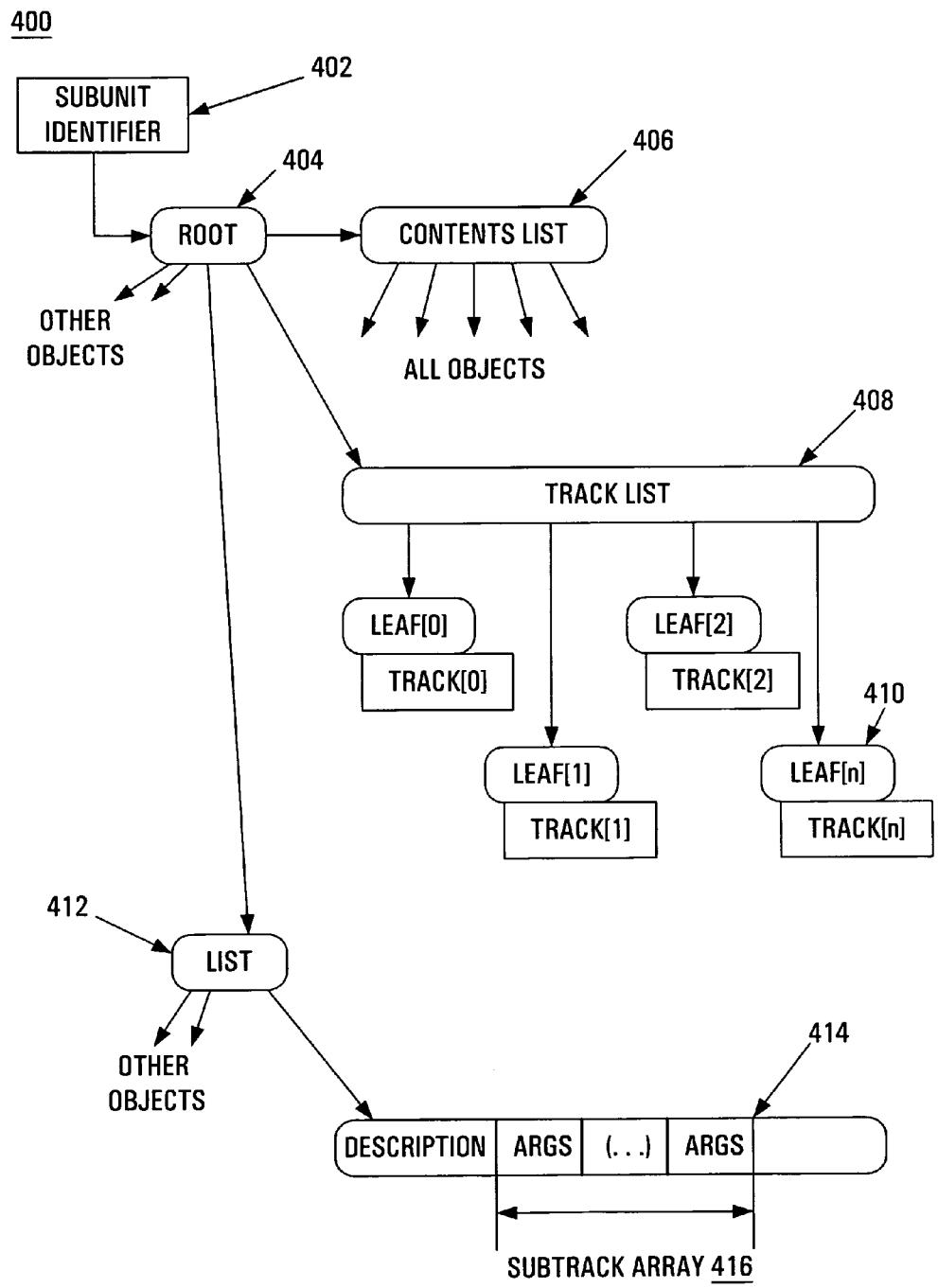
FIG. 4 is a diagram illustrating one embodiment of the object hierarchy used in accordance with the present invention.

FIG. 4 is a diagram illustrating object hierarchy 400 showing the hierarchical relationship between objects stored in HDD unit 60 (FIG. 3B) in accordance with one embodiment of the present invention. Object hierarchy 400 can be maintained in system memory 124 of HDD unit 60.

FIG. 4 illustrates that in the present embodiment, the object identifiers are arranged in hierarchical structure 400 in which objects directly or indirectly reference other objects. HDD 60 (FIG. 3B) manages the mapping of the object identifiers to the actual physical storage location of the data associated with an object. In hierarchical structure 400, a list object contains pointers to other objects and may be used to group objects that have a similar purpose. Objects that point to other objects use the object identifiers of the other objects as a reference rather than the address of the actual physical location of the data. An object can be directly accessed based on its object identifier. Alternatively, an object can be found by navigating through the object hierarchy, using the object identifier or the descriptive data.

Subunit identifier 402 is a unique identifier associated with one particular instance of HDD unit 60. For example, a unique number can be assigned to each HDD unit manufacturer, and each manufacturer can assign a unique number to each HDD unit, thus distinguishing each unit from another unit. In this embodiment, subunit identifier 402 is included into the object identifier so that the object identifiers are unique for each HDD unit. Hence, each object identifier on HDD unit 60 is unique not just for that HDD unit but it is also unique for all units. Thus, in case the object is copied from HDD unit 60 to, for example, a second HDD unit, the object identifier will not be the same as an object identifier already on the second HDD unit, and so the object identifier will not have to be changed. Therefore, in accordance with the present embodiment, an object known by a certain object identifier is unique and continues to be known by that object identifier even if it is copied from one HDD unit to another. Other devices on the AV network (e.g., network 40 of FIG. 2) can continue to access and retrieve that object from the various units using a single and permanent object identifier, and so in response to a request the correct object is always retrieved.

As described above, it is also possible to incorporate into the object identifier the time and date at which the object was initially stored. Alternatively, a counter could be implemented in the HDD unit; in this case, a new object identifier is generated by incrementing by one the value used for the immediately preceding object identifier. In combination with subunit identifier 402, this scheme will provide object identifiers that are unique to a single object across all devices for all time.

Continuing with reference to FIG. 4, in the present embodiment root 404 is a standard object used for facilitating access to other objects. Root 404 is at the top of object hierarchy 400 implemented in accordance with the present invention. Root 404 contains pointers to other objects; that is, root 404 is associated with other objects using the object identifiers for those objects. The descriptive portion of root 404 can be mapped to subunit identifier 402 and also to vendor-dependent data in a known fashion. Root 404 is also mapped to contents list 406. One embodiment of the structure of root 404 is provided in Table 1.

TABLE 1

Exemplary Root Structure

DIRECTORY
  LEAF/listId
    objectId (contents)
    objectId . . .
    DIRECTORY/refSet
      DIRECTORY/refInfo
  LEAF/subunit
  LEAF/vendor
  entries . . .

Contents list 406 of FIG. 4 is a specific instance of an object that references all of the track objects contained on HDD unit 60 (FIG. 3B). Contents list 406 is created and managed by HDD unit 60. In object hierarchy 400, contents list 406 is directly referenced by root 404 in the present embodiment. One embodiment of the structure of contents list 406 is provided in Table 2.

TABLE 2

Exemplary Contents List Structure

DIRECTORY
  LEAF/objectList
    DIRECTORY/refSet
      DIRECTORY/refInfo
    DIRECTORY/refSet
      DIRECTORY/refInfo
  entries . . .

Continuing with reference to FIG. 4, in the present embodiment, track list 408 is directly referenced by root 404. Track list 408 in turn references leaf objects (e.g., leaf[0], leaf[1], leaf[2], . . . , leaf[n]) which in turn are each associated with track objects (e.g., track[0], track[1], track[2], . . . , track[n], respectively). One embodiment of the structure of track list 408 is provided in Table 3.

TABLE 3

Exemplary Track List Structure

DIRECTORY/track
  DIRECTORY/trackInfo
    sizeInBytes
    sizeInTime
    extraInfo
    entries . . .

Descriptive data (e.g., "extraInfo") that can be specified for each leaf object include the type of data (e.g., isochronous or asynchronous), bandwidth requirements measured in quadlets (a quadlet is equivalent to four bytes), copy protection properties (e.g., copy-once, copy-never, play-once, etc.), and access rights (e.g., read/write permissions, etc.).

With reference still to FIG. 4, list 412 represents an object list that points to other objects. List 412 may be used to group objects that have a similar purpose, for example for the convenience of external applications.

Object 414 is mapped to list 412 and contains user-visible data such as descriptive information for describing itself. Subtrack array 416 references subtrack elements, where each subtrack element identifies a track object and a region of the track (see also FIG. 10).

Figure 5:
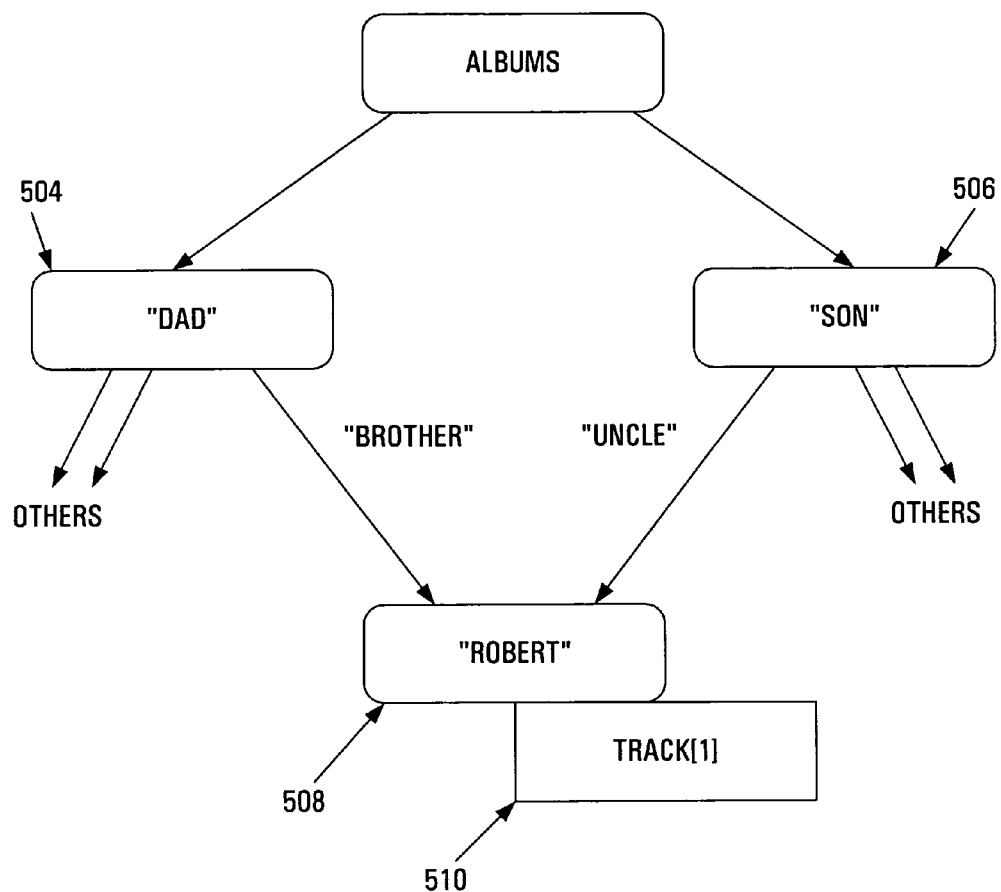
FIG. 5 is a diagram exemplifying descriptive data provided in the object hierarchy in accordance with one embodiment of the present invention.

FIG. 5 is an example of descriptive data in object hierarchy 500 in accordance with one embodiment of the present invention. An object may contain descriptive information that describes itself, such as the name of the object's creator. A directory within each object serves to affiliate its information with an object it references. Entries within the directory have an object identifier and descriptive data to describe the referenced object (see Table 1 above). Thus, for example, the name "Robert" (block 508) is affiliated with track[1] (block 510). In object hierarchy 500, other objects that point to block 508 ("Dad" block 504 and "Son" block 506) are used to provide context-specific information (e.g., "Brother" and "Uncle"). Thus, the descriptive information (e.g., "Dad" and "Son") that is affiliated with objects that point to another object (e.g., "Robert") is also affiliated with the referenced object.

The descriptive data portion of the object is organized into a hierarchical structure and thus supports generic descriptor navigator methods, so that vendor-dependent data can be identified and disregarded. Extended keys allow multiple vendors to uniquely label their vendor-dependent data using label value assignments that they allocate. The descriptive data format can be used with a variety of architectures such as the Control and Status Register (CSR) architecture for microcomputer buses.

Exemplary Commands

FIG. 6 illustrates the general data packet format 610 for AV/C commands used in accordance with the present embodiment of the present invention. These commands include: RECORD_TRACK, PLAY_TRACK, PLAY_TRACKS, READ_TRACK, and WRITE_TRACK, although it is appreciated that other commands may be used in accordance with the present invention. The commands each use the object identifier, which as explained above is unique and persistent for each object. Thus, in accordance with the present invention, each object is uniformly represented so that it can be readily accessed and so that the correct object is operated on according to the command being used.

With reference to FIG. 6, commands are presented in quadlet format. The "cts" (command transaction set) field is 4 bits in length and is used to distinguish an AV/C data packet format from other data packet formats. In the present embodiment, an AV/C data packet has a cts value of zero.

Continuing with reference to FIG. 6, the "ctype" (command type) field is four bits in length, the "subunit_type" field is five bits long, the "subId" field is three bits long, and the "opcode" field is eight bits long. In this embodiment, these fields are as defined in the proposed IEC-61883 standard. The 8-bit "operand[0]" field is standard and an operand[0] extension mechanism is provided for the commands defined for the present embodiment of the present invention.

FIG. 7 illustrates one embodiment of the RECORD_TRACK command structure 620. The RECORD_TRACK command structure contains parameters that specify how the recorded track object is generated. Addressing within isochronous track objects can be based on time during recording.

The 32-bit "modes" field provides RECORD_TRACK mode parameters. The 64-bit "objectId" field is formed by concatenating the 32-bit "objectIdHi" and "objectIdLo" values. If the specified objected value is null, a new track object is created. The 64-bit "startTime" field is formed by concatenating the 32-bit "startTimeHi" and "startTimeLo" values, after which the desired recording begins. The 64-bit "maxFileLength" field is formed by concatenating the 32-bit "maxFileLengthHi" and "maxFileLengthLo" values. If the specified maxFileLength value is null, all of the available space may be used. The 64-bit "maxElapsedTime" field is formed by concatenating the 32-bit "maxElapsedTimeHi" and "maxElapsedTimeLo" values. If the specified maxElapsedTime value is null, the recording may continue indefinitely. The 32-bit "tocPlacement" field specifies the location within the table of contents (e.g., contents list 406 of FIG. 4) that the object is to be placed.

The RECORD_TRACK command is used to receive data into the selected track object. If a null argument is provided for the objectId, an object is created, placed at the specified location within the table of contents, and used for recording data. In the present embodiment, recording starts with a zero-length track. Recording continues until the specified length is reached or exceeded, until the modes-specified condition is met, or until the available storage has been consumed, whichever occurs first.

FIG. 8 illustrates one embodiment of the PLAY_TRACK command structure 630. The PLAY_TRACK command is used to play track objects that lie between selected location markers using the parameters identified in the command. Addressing within isochronous track objects can be based on time during playback. The PLAY_TRACK command is used to transmit data from the selected track object to a previously initialized isochronous data stream.

Continuing with reference to FIG. 8, the 64-bit "objectId" field is formed by concatenating the 32-bit "objectIdHi" and "objectIdLo" values. If the specified objectId value is null, the first track object in the table of contents (e.g., content list 406 of FIG. 4) is assumed. The 64-bit "startOffset" value is formed by concatenating the 32-bit "startOffsetHi" and "startOffsetLo" values. If the specified value startOffset value is 00000000$_{16}$, the plays starts with the first data on the track. The 64-bit "endOffset" value is formed by concatenating the 32-bit "endOffsetHi" and "endOffsetLo" values. If the specified endOffset value is FFFFFFFF$_{16}$, the play ends with the last data on the track.

The PLAY_TRACK command plays selected track objects between the selected markers. The plays starts at the location specified by startOffset (or at the next location if startOffset is between locations) and ends at the location specified by endOffsetHi location (or at the previous location if the specified location is between locations). The track need not be played completely.

FIG. 9 illustrates one embodiment of the PLAY_TRACKS command structure 640. The PLAY_TRACKS command is used to play multiple track objects. The PLAY_TRACKS command structure references subtrack elements in a subtrack array (e.g., subtrack array 416 of FIG. 4), where each subtrack element identifies a track object and the region of the track object that is to be played.

Continuing with reference to FIG. 9, the 32-bit "modes" field provides the PLAY_TRACKS command parameters. The 64-bit "objectId" field is formed by concatenating the 32-bit "objectIdHi" and "objectIdLo" values. The 64-bit "startOffset" value is formed by concatenating the 32-bit "startOffsetHi" and "startOffsetLo" values, measured as a time offset within the first selected subtrack element from which the play should begin. The 64-bit "endOffset" value is formed by concatenating the 32-bit "endOffsetHi" and "endOffsetLo" values, measured as a time offset within the start location on the first selected subtrack element at which the play should end. The "entrySelect" value specifies the location in the specified object where the first play element is located. The "elementSelect" value specifies the location in the object list where the play element is located.

Figure 10:
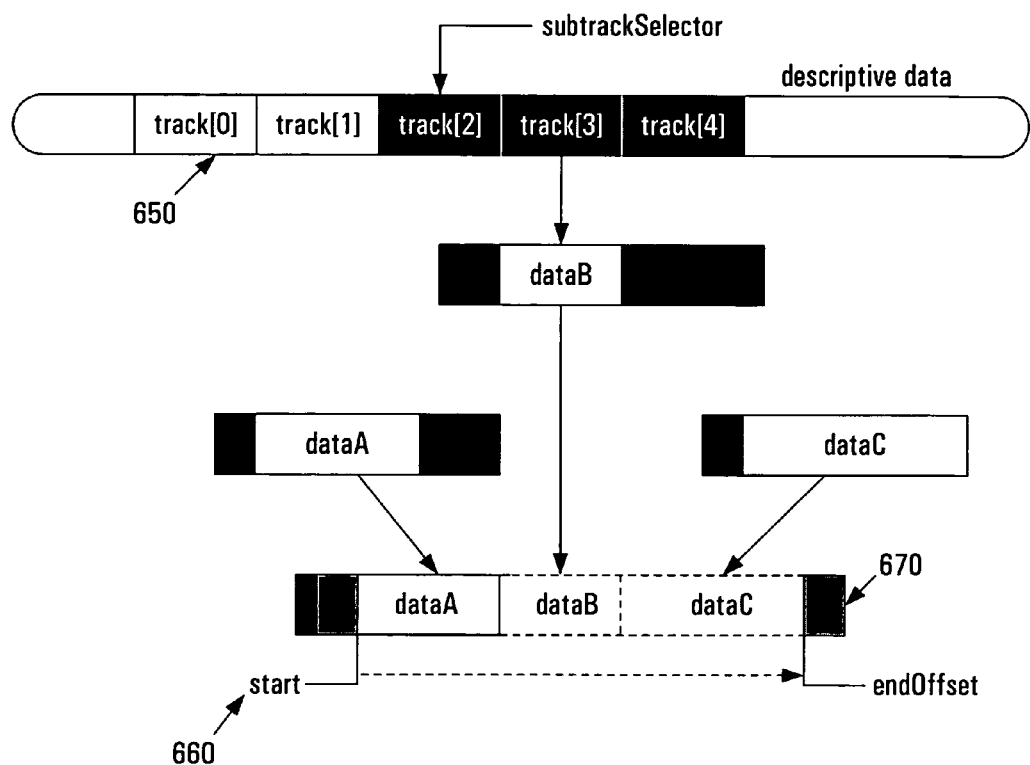
FIG. 10 illustrates the operation of the PLAY_TRACKS command with subtrack elements in accordance with one embodiment of the present invention.

With reference to FIG. 10, the PLAY_TRACKS command causes concatenation of subtrack elements 650 specified in an object's descriptive data, where each subtrack element specifies the portion of a track object that is included in the list of descriptive data. The PLAY_TRACKS operation begins at "start" offset 660 within the selected subtrack element. The operation continues through the following subtrack elements until a null subtrack element is reached (a null subtrack element is identified by a startOffset value of zero), a play-stopping condition is detected, or "endOffset" 670 location is reached, whichever occurs first.

FIG. 11 illustrates one embodiment of the READ_TRACK command structure 680. The READ_TRACK command is used to fetch portions of an asynchronous data block from a selected track object. The READ_TRACK command allows 256 bytes of data to be read from the specified track object. The 32-bit "modes" field provides READ_TRACK parameters. The 64-bit "objectId" value is formed by concatenating the 32-bit "objectIdHi" and "objectIdLo" values, and identifies the track object being accessed. The 64-bit "byteOffset" value is formed by concatenating the 32-bit "byteOffsetHi" and "byteOffsetLo" values, and identifies the track location being accessed.

FIG. 12 illustrates one embodiment of the WRITE_TRACK command structure 690. The WRITE_TRACK command is used to modify portions of an asynchronous data block from a selected track object. The WRITE_TRACK command allows 256 bytes of data to be written into the specified track object. The 32-bit "modes" field provides WRITE_TRACK parameters. The 64-bit "objectId" value is formed by concatenating the 32-bit "objectIdHi" and "objectIdLo" values, and identifies the track object being accessed. The 64-bit "byteoffset" value is formed by concatenating the 32-bit "byteOffsetHi" and "byteOffsetLo" values, and identifies the track location being accessed.

Thus, the present invention provides a method and system thereof for organizing and accessing objects stored on a hard disk device in an audio/visual (AV) network in a uniform manner, and for representing those objects to other devices in the AV network so that the objects are readily accessed and so that the correct object is retrieved. The present invention is flexible and allows the size of the object to be easily changed.

The preferred embodiment of the present invention, AV/C commands for accessing a hard disk device, is thus described. While the present invention has been described in particular embodiments, it should be appreciated that the present invention should not be construed as limited by such embodiments, but rather construed according to the below claims.

What is claimed is:

1. In a mass storage device, a method for organizing and accessing stored data representing audio and visual data, said method comprising:
   a) associating an object with said stored data;
   b) deriving a unique object identifier for said object and assigning said unique object identifier to said object, wherein said unique object identifier is unique to said mass storage device and also unique to all mass storage devices;
   c) maintaining said object in a hierarchical organization with other objects, wherein said hierarchical organization comprises an object list, said object list containing said unique object identifier and other unique object identifiers for said other objects; and
   d) accessing said object using said unique object identifier.

2. The method of claim 1 wherein step b) comprises using an embedded system of said mass storage device to derive and assign said unique object identifier.

3. The method of claim 1 wherein step b) comprises including in said unique object identifier a date and time corresponding to when said unique object identifier is derived such that said unique object identifier is unique to said mass storage device.

4. The method of claim 2 wherein step b) further comprises including in said unique object identifier a unique identification number, said unique identification number assigned only to said mass storage unit such that said unique object identifier is the only one of its kind.

5. The method of claim 1 wherein step c) further comprises creating a table of contents containing a list of objects associated with data stored on said mass storage device.

6. The method of claim 1 wherein step c) further comprises associating a first object to a second object using a unique object identifier for said second object.

7. The method of claim 6 wherein step d) comprises:
locating said first object using a unique object identifier for said first object; and
locating said second object using said unique object identifier for said second object.

8. The method of claim 1 wherein step d) comprises locating said object using descriptive data, wherein said object contains said descriptive data for describing said stored data.

9. The method of claim 1 further comprising accessing said object and executing a command using said object.

10. The method of claim 9 wherein said command specifies that said stored data associated with said object are to be recorded.

11. The method of claim 9 wherein said command specifies that said stored data associated with said object are to be played.

12. The method of claim 9 wherein said command is for reading from said stored data associated with said object.

13. The method of claim 9 wherein said command is for writing to said stored data associated with said object.

14. The method of claim 1 wherein said mass storage device is a magnetic disk device.

15. A mass storage unit comprising:
medium for storing data representing audio and visual content;
a head positioned adjacent to a surface of said medium such that said data are read to and written from said surface using said head; and
a microcontroller for controlling movement of said head;
wherein said microcontroller is for associating an object with said data, deriving a unique object identifier for said object, assigning said unique object identifier to said object and for accessing said object using said unique object identifier, wherein said unique object identifier is unique to said mass storage unit and across all mass storage units;
wherein said microcontroller is also for maintaining said object in a hierarchical organization with other objects, said hierarchical organization including an object list containing said unique object identifier and other unique object identifiers for said other objects, said other unique object identifiers also unique across all mass storage units.

16. The mass storage unit of claim 15 wherein said unique object identifier includes a unique identification number, said unique identification number assigned only to said mass storage unit such that said unique object identifier is unique across all mass storage units.

17. The mass storage unit of claim 15 wherein said microcontroller is also for creating a table of contents containing a list of objects associated with data stored on said mass storage unit.

18. The mass storage unit of claim 15 wherein said hierarchical organization further comprises a first object that is associated with a second object using a unique object identifier for said second object.

19. The mass storage unit of claim 18 wherein said first object is located using a unique object identifier for said first object and said second object is located using said unique object identifier for said second object.

20. The mass storage unit of claim 15 wherein said object contains descriptive data for describing said data, wherein said object is located using said descriptive data.

21. The mass storage unit of claim 15 wherein said microcontroller is also for accessing said object and executing a command using said object.

22. The mass storage unit of claim 21 wherein said command specifies that said stored data associated with said object are to be recorded.

23. The mass storage unit of claim 21 wherein said command specifies that said stored data associated with said object are to be played.

24. The mass storage unit of claim 21 wherein said command is for reading from said stored data associated with said object.

25. The mass storage unit of claim 21 wherein said command is for writing to said stored data associated with said object.

26. A mass storage unit comprising:
a storage means for storing data;
a data transfer means positioned adjacent to said storage means for reading and writing said data from and to said storage means; and
a microcontroller means for controlling movement of said data transfer means;
wherein said microcontroller means is for associating an object with said data, deriving a unique object identifier for said object, assigning said unique object identifier to said object, and accessing said object using said unique object identifier, wherein said unique object identifier is unique to said mass storage unit and across all mass storage units;
wherein said microcontroller means is also for maintaining said object in a hierarchical organization with other objects, said hierarchical organization including an object list containing said unique object identifier and other unique object identifiers for said other objects, said other unique object identifiers also unique to said mass storage unit and across all mass storage units.

27. The mass storage unit of claim 26 wherein said unique object identifier includes a date and time corresponding to when said unique object identifier is derived and a unique identification number, said unique identification number assigned only to said mass storage unit such that said unique object identifier is unique across all mass storage units.

28. The mass storage unit of claim 26 wherein said microcontroller means is also for creating a table of contents containing a list of objects associated with data stored on said mass storage unit.

29. The mass storage unit of claim 26 wherein said hierarchical organization further comprises a first object that is associated with a second object using a unique object identifier for said second object.

30. The mass storage unit of claim 26 wherein said object contains descriptive data for describing said data.

31. The mass storage unit of claim 26 wherein said microcontroller means is also for accessing said object and executing a command using said object.

* * * * *